UNITED STATES PATENT OFFICE.

PHILIPP WENZEL, OF MAYENCE, HESSE DARMSTADT, ASSIGNOR TO SAMPSON R. URBINO, OF BOSTON, MASSACHUSETTS.

IMPROVED SUBSTITUTE FOR LEATHER.

Specification forming part of Letters Patent No. 53,549, dated March 27, 1866.

*To all whom it may concern:*

Be it known that I, PHILIPP WENZEL, a citizen of the United States, and now residing at or near the city of Mayence, of the Grand Dutchy of Hesse Darmstadt, have invented a new and useful Composition, which may be used as a Substitute for Leather, or may be employed for various other useful purposes in the arts; and I do hereby declare the same and the mode of compounding it to be fully described as follows:

First, I take one part, by weight, of gelatine and dissolve it in three parts of water at a heat of about 60° to 65° Reaumur. To this solution is to be added, while it is heated and stirred over a fire, one-half a part of gum-arabic. On the gum being dissolved there should be added to the mixture one-fourth of a part of glycerine. There may also be added such pigment or mineral or vegetable color or colors as may be desirable for producing the proper coloring of the composition.

After well stirring the mixture it should be cooled to 30° Reaumur, after which the mass may be spread to the requisite thickness on a marble or glass tablet and there suffered to cool.

After the composition may have cooled the second part of the process is to be carried out with respect to it, the same being for the purpose of destroying the adhesive property or tacky character of the gelatine. This is done by means of a bath of tannic acid, which may consist of one part of crushed nutgalls, by weight, to two parts, by weight, of soft water, the nutgalls being boiled in the water for about one hour. The proportions of the nutgalls and water will depend much on circumstances.

The solution being placed in a shallow vessel the composition should be immersed in it and suffered to remain in it from four to six hours, after which it should be removed from the bath and be well dried on suitable frames or cloths properly strained.

The tanning process may be effected by other and well-known means, such as are adopted for the tanning of skins, the object being to convert the gelatine into tanno-gelatinate, whereby it is rendered insoluble in water.

To give to the surfaces of the sheet or composition a finished or smooth appearance they may be rubbed down with pumice-stone and afterward be polished with rotten-stone in the usual manner of polishing varnished surfaces.

I would remark that I do not confine my invention to the precise proportions of its ingredients, as hereinbefore explained, as they may be varied more or less and still be productive of useful results. The hardness and flexibility of the material produced will depend on the variation of these proportions, the article in one case being a close imitation of horn, while in another it may have imparted to it the flexible character of leather. Other variations of the proportions coupled with a due admixture of pigments or earthy or mineral with the gelatine, glycerine, and gum-arabic or the equivalent of the latter will suffice to produce a composition which can be molded to produce the appearance of a cameo or a medallion, or it may be converted into buttons or various other ornamental or useful articles.

I claim as my invention—

The composition made substantially as described.

PHILIPP WENZEL.

Witnesses:
AUGUST HAGNER,
JAMES WENTWORTH.